United States Patent [19]
Wilson, Jr.

[11] 4,252,295
[45] Feb. 24, 1981

[54] NATCH FOR MULTI-PART MOLD

[76] Inventor: Thomas J. Wilson, Jr., 808 20th St., Hondo, Tex. 78861

[21] Appl. No.: 1,297

[22] Filed: Jan. 5, 1979

Related U.S. Application Data

[63] Continuation of Ser. No. 839,667, Oct. 5, 1977, abandoned.

[51] Int. Cl.³ .............................................. B22C 21/10
[52] U.S. Cl. .................................. 249/205; 164/387; 403/13
[58] Field of Search ........................ 249/205; 164/387; 403/13

[56] References Cited

U.S. PATENT DOCUMENTS

| | | | |
|---|---|---|---|
| 3,022,553 | 2/1962 | Hines | 164/387 |
| 3,472,312 | 10/1969 | Rusk | 164/387 |
| 4,070,120 | 1/1978 | Bald et al. | 403/13 |

*Primary Examiner*—John C. Bleutge
*Assistant Examiner*—A. H. Koeckert
*Attorney, Agent, or Firm*—Peter J. Murphy

[57] ABSTRACT

A generally cylindrical body is molded from a soft plastic such as polyethylene. A reduced diameter coupling boss is formed at one end of the body, projecting from an alignment shoulder. An exterior alignment flange is formed at the other end; and a coupling recess is also formed in that other end having a diameter for a friction fit with the coupling boss of a mating natch body. The body includes means defining a relatively large retainer flange intermediate its ends, having opposed recesses so that its periphery is noncylindrical. Natches of this configuration are used as mating natches for both parts of a two part mold, with the alignment shoulder and alignment flange coinciding with the parting lines of the respective mold parts.

12 Claims, 7 Drawing Figures

NATCH FOR MULTI-PART MOLD

This is a continuation of application Ser. No. 839,667, filed Oct. 5, 1977 now abandoned.

BACKGROUND AND SUMMARY OF THE INVENTION

This invention relates to a natch configuration for a multi-part mold, such that a common natch part is used for both male and female natches as used in mating mold parts.

In the fabrication of molds for use in molding articles from vitreous enamel, china, and the like, many difficulties are experienced with natches which are commonly used with such molds, particularly with natches for production molds which are fabricated from plaster of paris. An important function of the natches is to maintain the precise alignment of mating mold parts, to produce a perfect seam on the molded product. One difficulty is that the natches become loose within the plaster of paris mold long before the mold is otherwise worn out; and the mold must then be discarded prematurely resulting in increased mold expense. Many natch configurations are two-part natches consisting of mating male and female parts. Such two-part natches are inherently more expensive, since the purchase and stocking of two separate parts is required. In many of the available natches, the mating alignment surfaces are complementary partial spherical surfaces, one convex and one concave. One difficulty with natches of this type, which are fabricated from metal, is that these complementary mating surfaces tend to deform resulting in poor alignment. Another difficulty with this type of natch is that the two natch parts do not stay together in precise mating relationship during fabrication of the mold parts; and the natches tend to float or move away from each other during the fabrication process. When this occurs, of course, the natches cannot perform their alignment function for the completed mold parts. Apart from the above mentioned difficulties with natches having spherical mating surfaces, even when the natches are properly positioned relative to the mold parts, the alignment of these spherical surfaces is imprecise so that ultimate alignment of the mold parts is not as precise as it might be. In other words, the mating male and female spherical surfaces fit together loosely in many instances. For all commercial natches having spherical mating surfaces, some material such as clay, vaseline or other form of temporary stickem must be used to hold the natches together during the mold fabrication and which can be readily removed after the mold is made. This involves two additional processing steps, namely, the placing of the stickem and the removal of the stickem.

A principal object of this invention is to provide a new and improved natch which overcomes the deficiencies and disadvantages of prior art natches as discussed above.

Another important object of this invention is to provide a new and improved natch which is a single unit natch, functioning as both the male and female mating natch members.

A further object of this invention is to provide a new and improved natch which is suitable for use with both large molds, such as molds for sanitary ware, and small molds such as molds for artware and fine china.

Still another object of this invention is to provide a new and improved natch which holds the mold parts together in perfect alignment for a perfect seam fit, and which maintains the parting lines for the mold parts through many casts.

A still further object of this invention is to provide a new and improved natch which will stay rigidly in place within the mold part throughout the life of the mold.

Another object of this invention is to provide a new and improved natch which is economic to manufacture.

These objects are accomplished in a natch for plaster molds which comprises a unitary, generally cylindrical body having a cylindrical coupling recess at one end and a reduced diameter cylindrical coupling boss at the other end. The inner diameter of the coupling recess and the outer diameter of the coupling boss correspond to each other, whereby the coupling recess of one natch will receive the coupling boss of another natch with a friction fit. The coupling boss, together with the adjacent portion of the body, defines an annular alignment shoulder facing the other end of the body; and the one end of the body has an external annular alignment flange defining an alignment end face. The natch body has means defining a radially projecting retainer flange disposed between, and spaced axially from, the alignment end face and the alignment shoulder. The retainer flange means has a noncircular periphery.

The novel features and the advantages of the invention, as well as additional objects thereof, will be understood more fully from the following description when read in connection with the accompanying drawings.

DRAWINGS

DESCRIPTION OF THE PREFERRED EMBODIMENT

Figure 1:
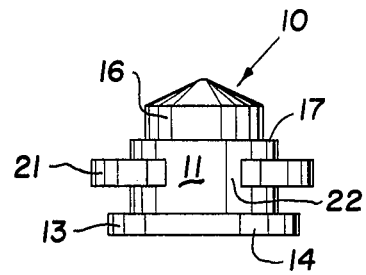
FIG. 1 is an elevation view of a natch according to the invention.
Figure 2:
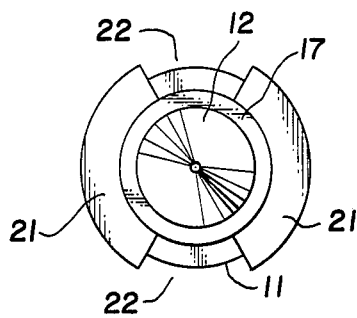
FIGS. 2 and 3 are respective top and bottom views of the natch of FIG. 1.
Figure 3:
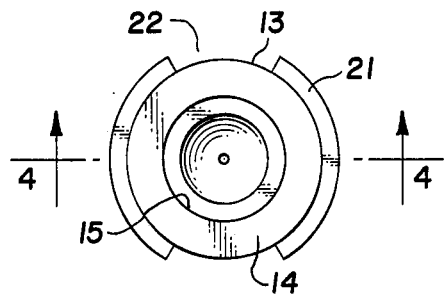
Figure 4:
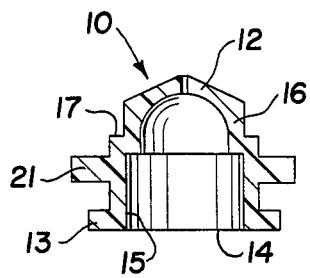
FIG. 4 is an axial sectional view taken in the plane 4—4 of FIG. 3.

The drawings illustrate a preferred form of natch suitable for use with plaster of paris multi-part molds—both large molds, such as for sanitary wear, and small molds such as for art ware and fine china. The natch illustrated in FIGS. 1 through 4 is a single or common natch unit which functions as both a male natch and a female natch in use, so that a pair of common or identical natch units makes up a natch set. The natch is a unitary part, preferably molded from a soft plastic material such as polyethylene by suitable low cost molding techniques.

Referring now particularly to FIGS. 1 through 4 of the drawing, a preferred form of natch unit 10 according to the invention is formed with a generally cylindrical hollow body 11 which is substantially closed at one end by an end wall 12. A breather port is formed centrally of the end wall. An external annular radial flange 13 is formed at the end of the body 11 opposite from the end wall 12; and this functions as an alignment flange, presenting a planar alignment end face 14 which is perpendicular to the central axis of the body 11. This alignment face coincides with the parting line of the mold with which the natch is used, when the natch functions as the female natch. The hollow body, at this alignment flange end, defines a cylindrical bore which functions as a coupling recess 15 of selected diameter. The alignment flange also functions as a stiffening rib to maintain the coupling recess cylindrical during the making of the mold, and serves to define the parting line throughout the life of the mold part.

At the closed end of the body 11, a portion of the body has a reduced external diameter which corresponds to the diameter of the coupling recess 15; and this portion defines a coupling boss 16. A transverse annular shoulder 17 defines the junction of the coupling boss 16 with the remainder of the body 11; and this shoulder is disposed in a plane perpendicular to the axis of the body and functions as an alignment shoulder. This alignment shoulder coincides with the parting line of the mold part with which it is used when the natch functions as a male natch.

An enlarged retainer flange 21 is formed on the body 11 intermediate the alignment face 14 and alignment shoulder 17. This retainer flange actually consists of portions of a discontinuous annular flange having recesses or notches 22, so that the flange does not have a uniform cylindrical periphery. This flange has the function of anchoring a natch within the mold part, both axially and rotationally. For this reason the flange is spaced from both the alignment face 14 and alignment shoulder 17 so that it will be spaced from the parting line of the mold part, for either the male or female mode of use, thereby allowing sufficient plaster between the retainer flange and the parting line to prevent axial breakout of the natch. The recesses 22 are sufficiently large so that the plaster entering these recesses will have sufficient strength to prevent rotation of the natch within the mold part after it is finished. To maintain the perfect alignment of the mold parts, it is necessary that the natches remain firmly held within the mold parts during the life of the mold. The life of the mold may involve many molding cycles; and the lives of the mold parts are increased by the use of natches which remain securely in place.

Figure 5:
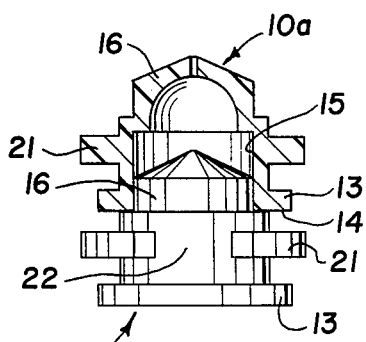
FIG. 5 is a view, partially in elevation and partially in section, of a pair of the natches of FIG. 1 disposed in mating alignment relation.

FIG. 5 of the drawing illustrates two natch units 10a and 10b, both having the configuration described above, illustrating the mating alignment relation of these natches wherein the natch 10a functions as a female natch and the natch 10b functions as a male natch.

Figure 6:
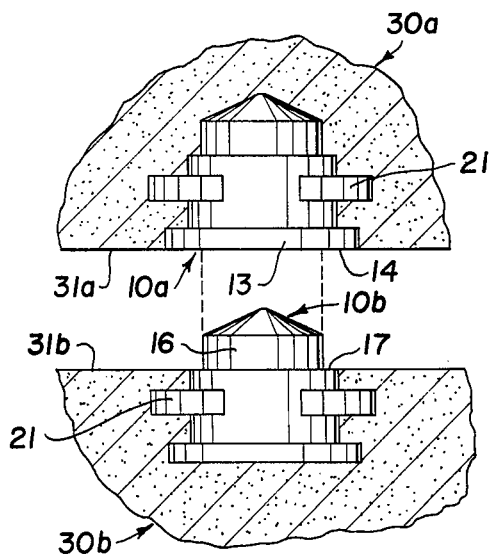
FIG. 6 is a fragmentary exploded view of mating mold parts with respective natches as illustrated in FIG. 1.

FIG. 6 is an exploded fragmentary view of two mating mold parts 30a and 30b, of a production or work mold for example; with a natch 10a being anchored in the mold part 30a, and with a natch 10b being anchored in the mold part 30b. This illustrates, for the mold part 30a, that the alignment face 14 coincides with the parting line 31a; and illustrates, for the mold part 30b, that the alignment shoulder 17 coincides with the parting line 31b.

Figure 7:
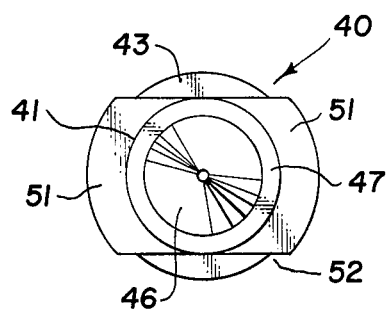
FIG. 7 is a top view of an alternative natch configuration.

FIG. 7 of the drawing illustrates an alternative natch configuration, according to the invention, which is identical to the natch of FIG. 1 with the exception of the configuration of the retaining flange. FIG. 7 is a top view, similar to FIG. 2, and illustrates a natch 40 having a body 41, a coupling boss 46 and associated alignment shoulder 47, and an alignment flange 43. A retainer flange 51 is defined by oppositely projecting ears; and the recesses 52 are defined by the spaces between these oppositely projecting ears. The side edges of the ears are slightly curved and merge generally tangentially with the cylindrical wall of the body 41.

FEATURES AND ADVANTAGES

The improved natch according to this invention is suitable for use with all of the several molds used in the process of making production molds namely the master mold and the case molds, as well as production or work molds. This obviates the necessity of stocking, as is done in some cases, different types of natches for the master and the case molds than are used for the production molds. When this is done, misalignment problems are aggravated. With the use of a common natch unit in the making of all of these molds, alignment of all mold parts is assured.

A particular feature of the natch configuration according to the invention, which goes further to assure precise alignment, is that the alignment surfaces of mating natches, namely the cylindrical coupling recess and the mating cylindrical coupling boss, are dimensioned for a friction fit to assure precise alignment of the respective mold parts when they are assembled. Even after many mold cycles, the alignment fit of the cylindrical coupling surfaces will maintain alignment much more precisely than would, for example, partially spherical mating surfaces.

An important feature, from the standpoint of low cost to the mold maker and user, is that the natch is molded from a plastic material, preferably soft plastic, by low cost production techniques; and that the natch unit is configured to function as a male or female natch so that only one natch part needs to be stocked rather than mating natch parts.

An ancillary advantage of the configuration wherein the coupling surfaces are cylindrical, is that the mating natch parts will remain in their aligned relation during the making of the mold part, thereby preventing movement of one of the mating natch parts during the pouring of the mold.

Still another important feature and advantage of the natch configuration according to the invention is that natch is sufficiently rugged, and therefore suitable, for relatively heavy molds such as are used in the manufacture of sanitary ware for example; and are also suitable for use with much lighter molds used in the fabrication of fine china or figures for example.

Another very important feature of the natch configuration is the provision of the alignment shoulder and the alignment flange having an alignment face, with the alignment shoulder and the alignment face coinciding with the parting lines of the respective mold parts. These structures providing these planar alignment surfaces (the end face and the shoulder) are sufficiently rugged to maintain the integrity of these alignment surfaces and, therefore, to extend the lives of plaster of paris production molds for example. Recognizing that plaster of paris wears in use, these alignment surfaces will define the parting lines for the respective mold parts through many molding cycles, thereby extending the lives of the molds.

An advantage of the use of natches fabricated from soft plastic is that, should the natches become slightly distorted through expansion or some other misfortune for example, whether in the master mold, the case molds, or the production molds, the distorted natch will yield enough so that a perfect fit is still obtained between the mold parts. Another advantage of molds fabricated from soft plastic is that natches can be retrieved from plaster of paris molds which must be discarded, for reuse in other molds. With natches fabricated from hard, brittle plastic or from metal, for example, it is nearly impossible to recover the natches from a mold part in sufficiently good condition for reuse.

A very important feature of the natch configuration is the design of the retainer flange which enables the natch to be very tightly retained within the plaster of paris mold and not become loose due to expansion or other problems. With this natch configuration, the natch is tightly retained against both axial and rotational movement within the case mold part.

While preferred embodiments of the invention have been illustrated and described, it will be understood by those skilled in the art that changes and modifications may be resorted to without departing from the spirit and scope of the invention.

What is claimed is:

1. A natch for plaster molds comprising
   a unitary, generally smooth cylindrical body having a cylindrical coupling recess at one end and a reduced diameter cylindrical coupling boss at the other end;
   the inner diameter of said coupling recess and the outer diameter of said coupling boss corresponding to each other, whereby the coupling recess of one natch will receive the coupling boss of another like natch with a friction fit;
   said coupling boss, together with the adjacent portion of said body, defining an annular alignment shoulder facing said other end of said body; said one end of said body having means defining an alignment end face;
   retainer flange means on said body disposed between and entirely spaced axially from said alignment end face and said alignment shoulder; on said cylindrical body; said retainer flange means projecting radially from said generally cylindrical body and having a periphery non-concentric with said body, thereby providing means for anchoring said natch against both axial movement and rotational movement within the mold.

2. A natch as set forth in claim 1
   said natch body being fabricated from a soft plastic material.

3. A natch as set forth in claim 1
   said alignment shoulder and said alignment end face being planar surfaces disposed perpendicular to the axis of said cylindrical body.

4. A natch as set forth in claim 3
   said means defining an alignment end face comprising an alignment flange having sufficient axial depth to maintain said alignment face in a plane.

5. A natch as set forth in claim 1
   said means defining an alignment end face comprising an annular stiffening rib for the mouth of said coupling recess.

6. A natch as set forth in claim 1
   said retainer flange means comprising a discontinuous annular flange.

7. A natch as set forth in claim 6
   said discontinuous annular flange having at least one recess in its periphery.

8. A natch as set forth in claim 1
   said retainer flange means comprising a plurality of ears projecting from said body.

9. A natch as set forth in claim 1
   said retainer flange means projecting radially beyond the remainder of said body.

10. A natch as set forth in claim 1
    said retainer flange means projecting substantially beyond said body.

11. A natch as set forth in claim 1
    said retainer flange means being spaced axially from said alignment shoulder, to enable the embedment of said retaining means in an associated plaster mold part to anchor said natch with its alignment shoulder disposed in the parting line of that mold part; and
    said retainer flange means being spaced axially from said alignment end face, to enable the embedment of said alignment means in an associated plaster mold part to anchor said natch with its alignment end face disposed in the parting line of that mold part.

12. A natch as set forth in claim 11
    either said alignment shoulder or said alignment end face of said natch being adapted to serve as an alignment surface for an associated mold part; and the natches associated with respective mating mold parts coacting to define the parting lines of said mating mold parts.

* * * * *